(12) United States Patent
Nilsson et al.

(10) Patent No.: US 11,031,996 B2
(45) Date of Patent: Jun. 8, 2021

(54) METHOD OF ENHANCING WIRELESS COMMUNICATION COVERAGE IN A COMMUNICATIONS SYSTEM, AN UNMANNED AERIAL VEHICLE, COMPUTER PROGRAM AND COMPUTER PROGRAM PRODUCTS

(71) Applicant: Telefonaktiebolaget LM Ericsson (publ), Stockholm (SE)

(72) Inventors: Andreas Nilsson, Gothenburg (SE); Jonas Fridén, Mölndal (SE); Fredrik Harrysson, Gothenburg (SE); Lars Manholm, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 62 days.

(21) Appl. No.: 16/309,554

(22) PCT Filed: Jun. 15, 2016

(86) PCT No.: PCT/EP2016/063689
§ 371 (c)(1),
(2) Date: Dec. 13, 2018

(87) PCT Pub. No.: WO2017/215743
PCT Pub. Date: Dec. 21, 2017

(65) Prior Publication Data
US 2019/0312633 A1      Oct. 10, 2019

(51) Int. Cl.
*H04B 7/185* (2006.01)
*G05D 1/10* (2006.01)
(Continued)

(52) U.S. Cl.
CPC ....... *H04B 7/18504* (2013.01); *B64C 39/024* (2013.01); *G05D 1/101* (2013.01);
(Continued)

(58) Field of Classification Search
None
See application file for complete search history.

(56) References Cited

U.S. PATENT DOCUMENTS

| 2008/0039012 A1* | 2/2008 | McKay | H04B 7/1555 455/11.1 |
| 2014/0218239 A1* | 8/2014 | Sharawi | G01S 3/38 342/422 |

(Continued)

FOREIGN PATENT DOCUMENTS

| GB | 2 532 966 A | 6/2016 |
| WO | 2015/180180 A1 | 12/2015 |
| WO | 2016/061535 A1 | 4/2016 |

OTHER PUBLICATIONS

M. Gruber, "Role of altitude when exploring optimal placement of UAV access points," 2016 IEEE Wireless Communications and Networking Conference, Doha, Qatar, 2016, pp. 1-5, doi: 10.1109/WCNC.2016.7565073. (Year: 2016).*

(Continued)

*Primary Examiner* — Alex Skripnikov
(74) *Attorney, Agent, or Firm* — Patent Portfolio Builders, PLLC

(57) ABSTRACT

A method (10) of enhancing wireless communication coverage in a communications system is disclosed. The method (10) is performed in an unmanned aerial vehicle (1) comprising a signal amplification device (25) arranged to convey wireless signaling. The method (10) comprises: ascending (11) to an altitude at which signaling is received from an entity (3, 4) of the communications system, and conveying (12) signaling between the entity (3, 4) and a first communication device (2). An unmanned aerial vehicle (1), computer program and computer program product are also provided.

18 Claims, 2 Drawing Sheets

(51) Int. Cl.
    *H01Q 21/20*   (2006.01)
    *H04W 16/18*   (2009.01)
    *H04W 24/02*   (2009.01)
    *H04W 64/00*   (2009.01)
    *B64C 39/02*   (2006.01)

(52) U.S. Cl.
    CPC ........... *H01Q 21/205* (2013.01); *H04B 7/185* (2013.01); *H04W 16/18* (2013.01); *H04W 24/02* (2013.01); *H04W 64/003* (2013.01); *B64C 2201/122* (2013.01); *B64C 2201/141* (2013.01)

(56) References Cited

U.S. PATENT DOCUMENTS

2016/0112116 A1* 4/2016 Jalali ................... H04W 72/085
                                                          370/252

2016/0337027 A1* 11/2016 Jalali ................... H04B 7/18504

OTHER PUBLICATIONS

J. Košmerl and A. Vilhar, "Base stations placement optimization in wireless networks for emergency communications," 2014 IEEE International Conference on Communications Workshops (ICC), Sydney, NSW, Australia, 2014, pp. 200-205, doi: 10.1109/ICCW.2014.6881196. (Year: 2014).*

M. Oodo et al., "Experiments on IMT-2000 using unmanned solar powered aircraft at an altitude of 20 km," in IEEE Transactions on Vehicular Technology, vol. 54, No. 4, pp. 1278-1294, Jul. 2005, doi: 10.1109/TVT.2005.851355. (Year: 2005).*

International Search Report and Written Opinion issued in International Application No. PCT/EP2016/063689, dated Mar. 24, 2017, 9 pages.

* cited by examiner

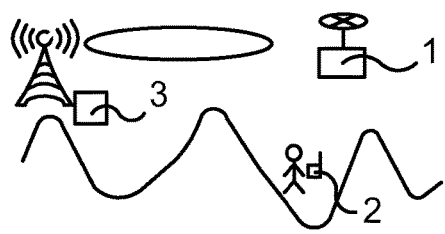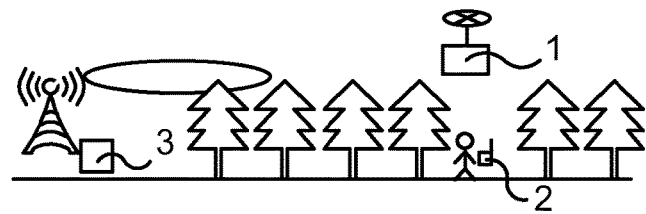
Scenario A    Scenario B
Fig. 1
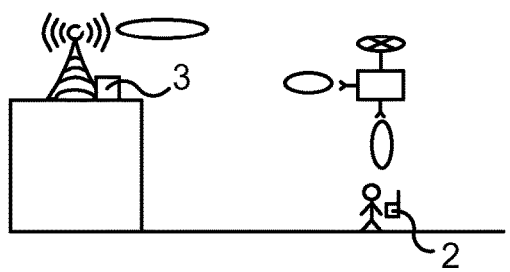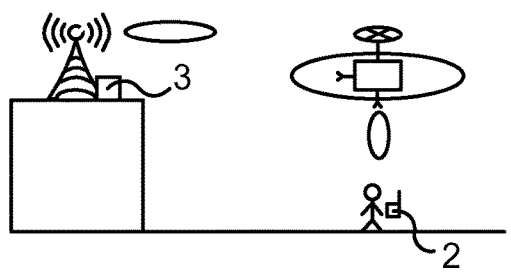
Fig. 2    Fig. 3
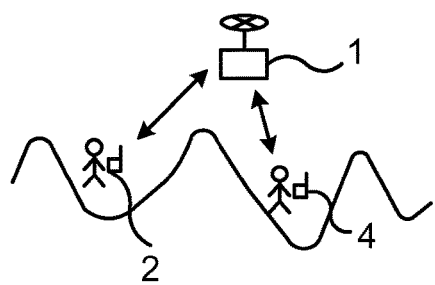
Fig. 4

METHOD OF ENHANCING WIRELESS COMMUNICATION COVERAGE IN A COMMUNICATIONS SYSTEM, AN UNMANNED AERIAL VEHICLE, COMPUTER PROGRAM AND COMPUTER PROGRAM PRODUCTS

CROSS REFERENCE TO RELATED APPLICATION(S)

This application is a 35 U.S.C. § 371 National Stage of International Patent Application No. PCT/EP2016/063689, filed Jun. 15, 2016, designating the United States.

TECHNICAL FIELD

The technology disclosed herein relates generally to the field of communication systems, and in particular to a method of enhancing wireless communication coverage in such a communications system, to an unmanned aerial vehicle, computer program and computer program products.

BACKGROUND

Nowadays wireless communication is relied upon to a large extent and although communication coverage provided by wireless communications networks is good in general there are still coverage holes, i.e. areas in which there is no coverage and hence no possibility to communicate wirelessly over the wireless communications network.

Various efforts can be made towards increasing the coverage. One way is to install additional access nodes in the coverage holes. However, this may be rather costly for the network operator, in particular in sparsely populated areas having a small number of regular customers. Another conceivable way is to increase transmission power. This entails the risk of increasing interference levels in the network and is not an adequate solution e.g. in areas far away from closest access node.

SUMMARY

An objective of the present teachings is to address the above mentioned problems. A particular objective is to enhance wireless communication coverage in an efficient and inexpensive way. This objective and others are achieved by the methods, devices, computer programs and computer program products according to the appended independent claims, and by the embodiments according to the dependent claims.

The objective is according to an aspect achieved by a method of enhancing wireless communication coverage in a communications system. The method may be performed in an unmanned aerial vehicle, the unmanned aerial vehicle comprising a signal amplification device arranged to convey wireless signaling. The method comprises: ascending to an altitude at which signaling is received from an entity of the communications system, and conveying signaling between the entity and a first communication device.

The method provides a number of advantages. For instance, a user of a wireless communications network is provided with an increased assurance of always having communication coverage, even in rural environments. Another advantage is that users are enabled to communicate with each other in a convenient manner even in areas having no coverage.

The objective is according to an aspect achieved by a computer program for an unmanned aerial vehicle for enhancing wireless communication coverage. The computer program comprises computer program code, which, when executed on at least one processor on the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle for enhancing wireless communication coverage in a communications system. The unmanned aerial vehicle comprises a signal amplification device arranged to convey wireless signaling, and is configured to ascend to an altitude at which signaling is received from an entity of the communications system, and to convey signaling between the entity and a first communication device.

Further features and advantages of the embodiments of the present teachings will become clear upon reading the following description and the accompanying drawings.

BRIEF DESCRIPTION OF THE DRAWINGS

FIG. 1 illustrates exemplary scenarios in which embodiments of the present teachings may be used.

FIGS. 2 and 3 illustrate exemplary antenna directions.

FIG. 4 illustrates an exemplary scenario in which embodiments of the present teachings may be used.

DETAILED DESCRIPTION

Figure 5:
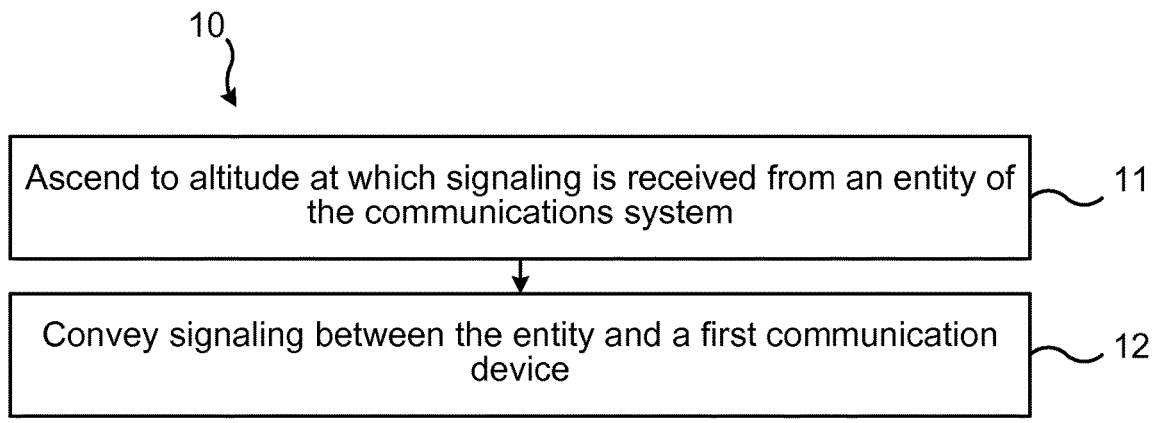
FIG. 5 illustrates a flow chart over steps of an embodiment of a method in an unmanned aerial vehicle in accordance with the present teachings.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Unmanned aerial vehicles (UAV), often denoted drones, are becoming more and more common and used for various purposes. Examples of use cases for drones are, for instance, aerial surveillance, professional aerial surveying, commercial and motion picture filmmaking, news gathering for journalism, observation by police forces, search and rescue operations, scientific research, disaster relief, cargo transportation etc. The inventors of the present application have realized the usability of this development for enhancing coverage in e.g. rural areas having, for instance, large variations in height, i.e. landscapes with large altitude differences, and/or deep forests hindering wireless communication.

Briefly, an architecture and method for a small pocket sized unmanned aerial vehicle (in the following denoted drone) is provided, the drone comprising a signal amplification device, such as an integrated repeater or relay, for enhancing wireless communication signals between access nodes and user devices or between two or more user devices.

The drones can be made very small, down to a couple of centimeters in diameters. According to the present teachings, the drone is provided with a small repeater or relay for wireless mobile communications, which may also be made very small, having e.g. a size around couple of centimeters in diameter. The drones may, for instance be provided with electronic hardware similar to the electronic hardware used in current mobile phones. By mounting such small repeater, or other signal amplifying device, on a small drone a small flying repeater is provided. This small flying repeater, also called personal drone repeater in the following, have such size as to be easily kept in a pocket or a small hand bag.

FIG. 1 illustrates exemplary scenarios in which embodiments of the present teachings may be used. Assuming a person is walking in the wilderness where there is bad or no coverage from the wireless communication system and that the person, for some reason, needs to use his/hers communication device 2 (e.g. a user equipment, UE, smart phone, tablet etc.) to make a call or look at internet. In this case the person can take the personal drone repeater 1 out from the pocket or handbag and send it up in the air. When the personal drone repeater 1 is in the air, it has a good chance to get a line-of-sight (LOS) channel with at least one access point 3 (e.g. base station) of the wireless communications system and hence obtain enough signal power to be in coverage. The personal repeater drone 1 may then convey the radio signals from the access point 3 down to the communication device 2 so that the communication device 2 also gets coverage. It is now possible for the person to make the call or access the internet.

FIG. 1 illustrates two different example scenarios where a user re-establishes coverage by using the personal drone repeater 1. In the leftmost scenario the user is in a valley out of coverage in a no-flat rural area. By sending up the person drone repeater 1 a LOS channel is created between the access point 3 and the personal drone repeater 1. This will significantly increase the chance of being within an extended coverage.

In the rightmost scenario the user is in the woods and due to extra penetration loss created by the trees the user is out of coverage. By sending up the personal drone repeater 1, the channel between the access point 3 and the personal drone repeater 1 avoids the penetration loss of the trees. How high up the personal drone repeater 1 should fly from the ground may be decided in a number of different ways, for example; the height may be a pre-programmed fixed height, the user may manually program the height when he/she sends the personal drone repeater 1 up in the air, the user may manually control the height of the personal drone repeater 1 with a remote controller and detect when the personal drone repeater 1 is up high enough such that coverage of the communication device 2 is obtained, or the personal drone repeater 1 may measure the received signal strength when it flies up in the air and then, when the signal strength goes above a certain threshold, it stops increasing the height.

Instead of a repeater arranged on the personal drone repeater 1, a relay may be used. A relay is somewhat more complex and more expensive than a repeater but typically gives better performance.

FIGS. 2 and 3 illustrate exemplary antenna directions. A repeater/relay has two different antennas; a donor antenna communicating with the communication device 2 and a pick-up antenna communicating with the access point 3, in the following exemplified by base station. The beam of the donor antenna may preferably be pointing towards the ground where the user is located. The pick-up antenna may either be a direction, as illustrated in FIG. 2 or omni-directional, as illustrated in FIG. 3. One benefit with a directional antenna as the pick-up antenna is that the antenna gain towards the base station 3 increases in case the beam is directed towards the base station 3, which then will enhance the coverage range of the personal drone repeater 1. This could be done for example by letting the personal drone repeater 1 rotate horizontally in the air while measuring the received signal strength from the base station 3. In this way it is possible to find out from which direction the signals come and then the personal drone repeater 1 can turn itself such that the beam points towards the base station 3.

In some embodiments, instead of first reaching the intended height and then start rotating, the personal drone repeater 1 may ascend while rotating, continuously measuring the signal strength and in this way find the appropriate height and rotation.

That is, in an embodiment of a method provided herein, the personal drone repeater 1 is configured to, after the user has sent up the personal drone repeater in the air:
  reach the height over the ground that it is intended to reach,
  start rotating in the horizontal dimension and at the same time measure the received signal strength. When the personal drone repeater 1 has rotated 360°, it may evaluate in which direction the highest received signal strength is received, and then the personal drone repeater 1 may rotate to the direction corresponding to the strongest received signal.

In another embodiment of a method provided herein, the personal drone repeater 1 is assumed to have an omni-directional pick-up antenna and the personal drone repeater 1 increases the height until the signal strength reaches a certain level. This embodiment may be combined with a directional pick-up antenna of the personal drone repeater 1, in such case the personal drone repeater 1 has to also rotate horizontally while it is increasing its height in order to find both a good height and a good direction of the beam.

That is, in an embodiment of a method provided herein, the personal drone repeater 1 is configured to, after the user has sent up the personal drone repeater in the air:
  increase its height while it continuously measures received signal strength from the surrounding base stations 3 or other types of access points,
  upon the received signal power exceeding a certain threshold, the personal drone repeater 1 stops increasing its height, and
  convey signaling between the communication device and the base station 3.

FIG. 4 illustrates an exemplary scenario in which embodiments of the present teachings may be used. In particular, the personal drone repeater 1 may also be used for peer to peer communication, i.e. communication between two or more communication devices 2, 4, e.g. between two UEs. This may, for instance, be useful if a hunting party is out in the woods and need to communicate with each other. An example of this is illustrated in FIG. 4, wherein the personal drone repeater 1 is sent up in the air and conveys signaling from a first communication device 2 and a second communication device 4. As illustrated, the users are separated by a high mountain and a LOS channel cannot be obtained. Such peer-to-peer communication, or device-to-device (D2D) communication, may reuse portions of the frequency spectrum used by e.g. the cellular transmitter of the communication devices 2, 4. In other embodiments, the D2D communication may use available empty portions of such frequency spectrum.

In some embodiments, the personal drone repeater 1 and the communication device 2 continuously exchange GPS coordinates such that when the communication device 2 moves the personal drone repeater 1 will follow the movements of the communication device 2. The tracking of the communication device 2 may be accomplished in different ways, e.g. by using digital image processing, or by estimating the direction of the radio signal from the communication device 2.

In yet another embodiment, the directivity of the beam of the pick-up antenna and/or donor antenna can be adjusted depending on how far the personal drone repeater 1 is from the base station 3 and from the communication device 2. For example if the personal drone repeater 1 is high up in the air over the communication device 2, it might be better to use a narrow high directive beam of the donor antenna in order to increase the path gain between the communication device 2 and personal drone repeater 1.

FIG. 5 illustrates a flow chart over steps of an embodiment of a method in an unmanned aerial vehicle in accordance with the present teachings.

A method 10 of enhancing wireless communication coverage in a communications system is provided. The method 10 may be performed in an unmanned aerial vehicle 1, the unmanned aerial vehicle 1 comprising a signal amplification device 25 arranged to convey wireless signaling.

The method 10 comprises ascending 11 to an altitude at which signaling is received from an entity 3, 4 of the communications system.

The method 10 comprises conveying 12 signaling between the entity 3, 4 and a first communication device 2.

The signal amplification device 25 may comprise a repeater that simply amplifies power of a signal that it receives from an access node 3 of a wireless communications system. In other embodiments, the signal amplification device 25 comprises a relay, which is able to perform also other signal processing besides power amplification. For instance, when implemented as a relay, the signal amplification device 25 may perform power amplification of a signal, but may also down convert e.g. radio frequency signals and conversely up convert radio frequency signals, perform demodulation and decoding, and conversely modulation and encoding.

In an embodiment, the ascending 11 comprises:
ascending to the altitude while measuring received signal strength,
determining that the measured signal strength has reached a threshold value, and
coming to a standstill.

In another embodiment, the ascending 11 comprises ascending to the altitude having a predefined value and then coming to a standstill.

In some embodiments, the method 10 comprises prior to the conveying 12:
rotating around a vertical axis while measuring a received signal strength for at least two directions, and
rotating to a direction for which the highest received signal strength was measured.

The various embodiments above may be combined in different ways as have been described. For instance, the method 10 may comprise having the unmanned aerial vehicle 1 rising continuously while simultaneously rotating and measuring the signal strength. When the measured signal strength is determined to have reached the threshold value, which may be set such as to ensure signal strength to be sufficient, the unmanned aerial vehicle may come to a standstill. The features of the embodiments may be combined in many ways, providing various new embodiments e.g. combining the altitude changes and the rotation around a vertical axis in different ways such as to find a height and direction for receiving a sufficiently high signal power from the entity 3, 4 of the wireless communications system for conveyance to the first communication device 2, and also in the reverse direction from the first communication device 2 to the network entity 3.

In various embodiments, the conveying 12 the signaling comprises amplifying the signaling.

In various embodiments, the entity 3, 4 of the communications system comprises an access node 3 or a second communication device 4.

In various embodiments, the unmanned aerial vehicle 1 comprises a donor antenna communicating with the first communication device 2 and a pick-up antenna communicating with the entity 3, 4, and the method 10 comprises using an omnidirectional antenna as the pick-up antenna and a directional antenna as the donor antenna.

In various embodiments, the method 10 comprises tracking movements of the first communication device 2 and flying in correspondence with any longitudinal and latitudinal movements of the tracked movements of the first communication device 2.

In various variations of the above embodiments, the tracking comprises one of: exchanging Global Positioning Signaling, GPS, with the first communication device 2 and estimating direction of signal from the first communication device 2.

Figure 6:
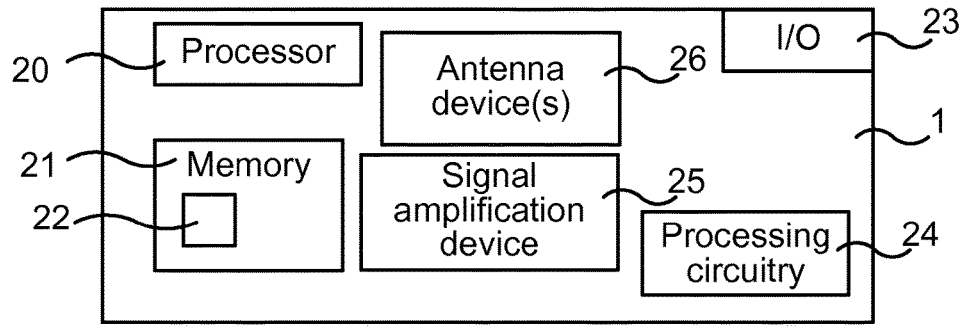
FIG. 6 illustrates schematically an unmanned aerial vehicle and means for implementing embodiments of the method in accordance with the present teachings.

FIG. 6 illustrates schematically an unmanned aerial vehicle and means for implementing embodiments of the method in accordance with the present teachings.

The unmanned aerial vehicle 1 comprises a processor 20 comprising any combination of one or more of a central processing unit (CPU), multiprocessor, microcontroller, digital signal processor (DSP), application specific integrated circuit etc. capable of executing software instructions stored in a memory 21 which can thus be a computer program product. The processor 20 can be configured to execute any of the various embodiments of the method 10 for instance as described in relation to FIG. 5.

The memory 21 of the unmanned aerial vehicle 1 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

The unmanned aerial vehicle 1 may, optionally, comprise an interface 23 for communication with other devices and/or entities. The interface 23 may, for instance, comprise a protocol stack, for communication with other devices or entities. The interface may be used for receiving data input and for outputting data.

The unmanned aerial vehicle 1 may comprise additional processing circuitry, schematically indicated at reference numerals 24 for implementing the various embodiments according to the present teachings.

The unmanned aerial vehicle 1 may comprise one or more antenna devices 26. As has been described, the unmanned aerial vehicle 1 may comprise a first antenna device (e.g. a donor antenna) for communicating with a first communication device 2 and a second antenna device (e.g. a pick-up antenna) for communicating with an entity 3, 4 of the communications system, e.g. an entity such as an access point (e.g. a base station). In some embodiments, the first antenna device may comprise a directional antenna, and the second antenna device may comprise an omnidirectional antenna.

The unmanned aerial vehicle 1 comprises a signal amplification device 25. This may, for instance, be implemented as a repeater or as a relay. A repeater may be an electronic device that receives a signal and retransmits it at a higher level or higher power, or onto the other side of an obstruction, so that the signal can cover longer distances. The signal amplification device 25 may perform only power amplification of a received signal, e.g. a signal from a network node (e.g. LTE eNB or LTE Base Station). After amplification it transmits the signal to the communication device 2, e.g. a User Equipment (UE).

In other embodiments, the signal amplification device 25 may be implemented as a relay (e.g. LTE relay). A relay is different than a repeater as it does the amplification as well as some other signal processing. The relay may, for instance, perform down conversion of a signal (e.g. radio frequency signal), demodulate and decode the signal, and conversely modulate and encode the signal, and as a final example, perform up conversion of the signal.

The unmanned aerial vehicle 1 comprising a repeater is typically less costly than if it comprises a relay, but the relay may have a higher performance, e.g. having an improved Signal-to-noise ratio (SNR) compared to the repeater.

An unmanned aerial vehicle 1 is provided for enhancing wireless communication coverage in a communications system. The unmanned aerial vehicle 1 comprises a signal amplification device 25 arranged to convey wireless signaling. The unmanned aerial vehicle 1 is configured to:
ascend to an altitude at which signaling is received from an entity 3, 4 of the communications system, and
convey signaling between the entity 3, 4 and a first communication device 2.

The unmanned aerial vehicle 1 may be configured to perform the above steps e.g. by comprising one or more processors 20 and memory 21, the memory 21 containing instructions executable by the processor 20, whereby the unmanned aerial vehicle 1 is operative to perform the steps.

That is, in an embodiment, an unmanned aerial vehicle 1 is provided for enhancing wireless communication coverage in a communications system. The unmanned aerial vehicle comprises one or more processors 20 and memory 21, the memory 21 containing instructions executable by the processor 20, whereby the unmanned aerial vehicle is operative to: ascend to an altitude at which signaling is received from an entity of the communications system, and convey signaling between the entity and a first communication device.

In an embodiment, the unmanned aerial vehicle 1 is configured to ascend by:
ascending to the altitude while measuring received signal strength,
determining that the measured signal strength has reached a threshold value, and
coming to a standstill.

In another embodiment, the unmanned aerial vehicle 1 is configured to ascend by ascending to the altitude having a predefined value and then coming to a standstill.

In an embodiment, the unmanned aerial vehicle 1 is configured to, prior to the conveying:
rotate around a vertical axis while measuring a received signal strength for at least two directions, and
rotate to a direction for which the highest received signal strength was measured.

In an embodiment, the unmanned aerial vehicle 1 is configured to convey the signaling by amplifying the signaling.

In an embodiment, the unmanned aerial vehicle 1 comprises a donor antenna configured to communicate with the first communication device 2 and a pick-up antenna configured communicate with the entity 3, 4, and the unmanned aerial vehicle 1 being configured to use an omnidirectional antenna as the pick-up antenna and a directional antenna as the donor antenna.

In an embodiment, the unmanned aerial vehicle 1 is configured to track movements of the first communication device 2 and to fly in correspondence with any to longitudinal and latitudinal movements of the tracked movements of the first communication device 2.

In an embodiment, the unmanned aerial vehicle 1 is configured to track by one of: exchanging Global Positioning Signaling, GPS, with the first communication device 2 and estimating direction of signal from the first communication device 2.

The present teachings also encompass a computer program 22 for an unmanned aerial vehicle 1 for enhancing wireless communication coverage in a communications system. The computer program 22 comprises computer program code, which, when executed on at least one processor on the unmanned aerial vehicle 1, causes the unmanned aerial vehicle 1 to perform the method to according to any of the described embodiments.

The present teachings also encompass computer program products 21 for a unmanned aerial vehicle 1. The computer program product 21 comprises the computer program 22 for implementing the embodiments of the methods as described, and a computer readable means on which the computer program 22 is stored. The computer program product, or the memory, thus comprises instructions executable by the processor 20. Such instructions may be comprised in a computer program, or in one or more software modules or function modules. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 7:
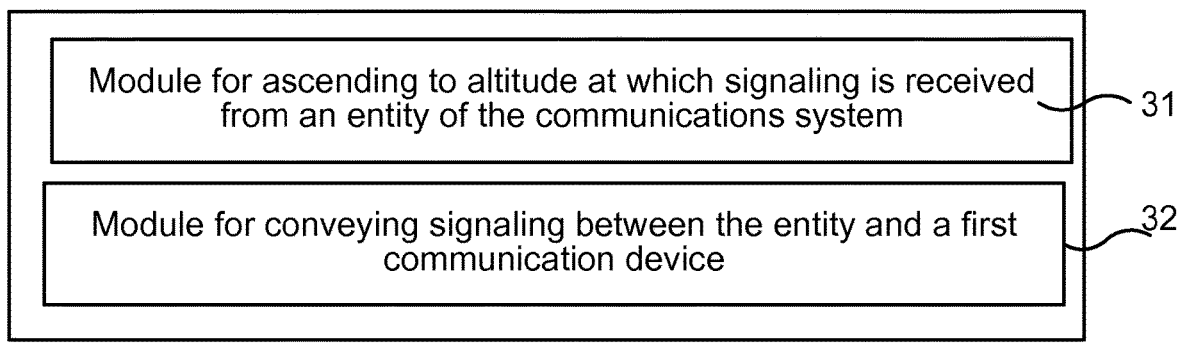
FIG. 7 illustrates an unmanned aerial vehicle comprising function modules/software modules for implementing embodiments of the present teachings.

FIG. 7 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

An unmanned aerial vehicle is provided for enhancing wireless communication coverage in a communications system, the unmanned aerial vehicle comprising a signal amplification device arranged to convey wireless signaling. The unmanned aerial vehicle comprises a first module 31 for ascending to an altitude at which signaling is received from an entity of the communications system. Such first module 31 may, for instance, comprise processing circuitry adapted for such ascending, e.g. processing circuitry adapted to control movements in an elevation direction.

The unmanned aerial vehicle comprises a second module 32 for conveying signaling between the entity and a first communication device. Such second module 32 may, for instance, comprise processing circuitry adapted for handling signaling, and/or antenna devices or antenna circuitry and/or a relay device or a repeater device.

It is noted that one or both of the modules 31, 32 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of enhancing wireless communication coverage in a communications system, the method being performed in an unmanned aerial vehicle, the unmanned aerial vehicle comprising a signal amplification device arranged to convey wireless signaling, and the method comprising:
   measuring a received signal strength from an entity of the communications system while rotating horizontally and ascending to an altitude to find a height and a direction at which the wireless signaling is received from the entity of the communications system, wherein the rotating comprises:
      rotating around a vertical axis while measuring the received signal strength for at least two directions, and
      rotating to a direction for which the highest received signal strength was measured; and
   conveying the wireless signaling between the entity and a first communication device wherein the unmanned aerial vehicle comprises a donor antenna communicating with the first communication device and a pick-up antenna communicating with the entity.

2. The method of claim 1, wherein the ascending comprises:
   determining that the measured received signal strength has reached a threshold value; and
   coming to a standstill.

3. The method of claim 1, wherein the ascending comprises:
   ascending to the altitude having a predefined value and then coming to a standstill.

4. The method of claim 1, wherein the conveying the wireless signaling comprises amplifying the wireless signaling.

5. The method of claim 1, wherein the entity of the communications system comprises an access node or a second communication device.

6. The method of claim 1, wherein the method further comprises:
   using an omnidirectional antenna as the pick-up antenna and a directional antenna as the donor antenna.

7. The method of claim 1, further comprising:
   tracking movements of the first communication device and flying the unmanned aerial vehicle in correspondence with any longitudinal and latitudinal movements of the tracked movements of the first communication device.

8. The method of claim 7, wherein the tracking comprises one of: exchanging Global Positioning Signaling (GPS) with the first communication device and estimating direction of signal from the first communication device.

9. The method of claim 1, further comprising:
   adjusting a directivity of beam of at least one of:
      the donor antenna based on a distance between the unmanned aerial vehicle and the first communication device, and
      the pick-up antenna based on a distance between the unmanned aerial vehicle and the entity.

10. A computer program product comprising a non-transitory computer readable medium storing a computer program for an unmanned aerial vehicle for enhancing wireless communication coverage in a communications system, the computer program comprising computer program code which, when executed on at least one processor on the unmanned aerial vehicle causes the unmanned aerial vehicle to perform a method comprising:
    measuring a received signal strength from an entity of the communications system while rotating horizontally and ascending to an altitude to find a height and a direction at which wireless signaling is received from the entity of the communications system, wherein the rotating comprises:
       rotating around a vertical axis while measuring the received signal strength for at least two directions, and
       rotating to a direction for which the highest received signal strength was measured; and
    conveying the wireless signaling between the entity and a first communication device wherein the unmanned aerial vehicle comprises a donor antenna communicating with the first communication device and a pick-up antenna communicating with the entity.

11. An unmanned aerial vehicle for enhancing wireless communication coverage in a communications system, the unmanned aerial vehicle comprising a signal amplification device arranged to convey wireless signaling, and being configured to:
    measure a received signal strength from an entity of the communications system while the unmanned aerial vehicle rotates horizontally and ascends to an altitude to find a height and a direction at which the wireless signaling is received from the entity of the communications system, wherein the unmanned aerial vehicle is configured to:
       rotate around a vertical axis while measuring the received signal strength for at least two directions, and
       rotate to a direction for which the highest received signal strength was measured; and
    convey the wireless signaling between the entity and a first communication device wherein the unmanned aerial vehicle comprises a donor antenna configured to communicate with the first communication device and a pick-up antenna configured to communicate with the entity.

12. The unmanned aerial vehicle of claim 11, wherein the unmanned aerial vehicle is further configured to:
    determine that the measured received signal strength has reached a threshold value; and
    come to a standstill.

13. The unmanned aerial vehicle of claim 11, wherein the unmanned aerial vehicle is further configured to:
    ascend to the altitude having a predefined value and then come to a standstill.

14. The unmanned aerial vehicle of claim 11, wherein the unmanned aerial vehicle is configured to convey the wireless signaling by amplifying the wireless signaling.

15. The unmanned aerial vehicle of claim 11, wherein the unmanned aerial vehicle is further configured to:
use an omnidirectional antenna as the pick-up antenna and a directional antenna as the donor antenna.

16. The unmanned aerial vehicle of claim 11, wherein the unmanned aerial vehicle is further configured to:
track movements of the first communication device and to fly the unmanned aerial vehicle in correspondence with any longitudinal and latitudinal movements of the tracked movements of the first communication device.

17. The unmanned aerial vehicle of claim 16, wherein the unmanned aerial vehicle is configured to track by one of: exchanging Global Positioning Signaling (GPS) with the first communication device and estimating direction of signal from the first communication device.

18. The unmanned aerial vehicle of claim 11, wherein the unmanned aerial vehicle is further configured to:
adjust a directivity of beam of at least one of:
the donor antenna based on a distance between the unmanned aerial vehicle and the first communication device, and
the pick-up antenna based on a distance between the unmanned aerial vehicle and the entity.

* * * * *